US011562214B2

(12) United States Patent
Guo (10) Patent No.: US 11,562,214 B2
(45) Date of Patent: Jan. 24, 2023

(54) METHODS FOR IMPROVING AI ENGINE MAC UTILIZATION

(71) Applicant: Baidu USA LLC, Sunnyvale, CA (US)

(72) Inventor: Min Guo, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 986 days.

(21) Appl. No.: 16/354,107

(22) Filed: Mar. 14, 2019

(65) Prior Publication Data
US 2020/0293866 A1    Sep. 17, 2020

(51) Int. Cl.
| | |
|---|---|
| *G06N 3/063* | (2006.01) |
| *G06F 16/901* | (2019.01) |
| *G06F 9/00* | (2006.01) |
| *G06F 7/544* | (2006.01) |

(52) U.S. Cl.
CPC ........... *G06N 3/063* (2013.01); *G06F 7/5443* (2013.01); *G06F 9/00* (2013.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 10,853,906 | B2* | 12/2020 | Ould-Ahmed-Vall | ...................... G06N 3/063 |
| 10,872,295 | B1* | 12/2020 | Liu | ........ G06F 7/5443 |
| 11,227,030 | B2* | 1/2022 | Simpson | ................. G06F 17/16 |
| 11,237,894 | B1* | 2/2022 | Baum | ................... G06F 11/076 |
| 2003/0105799 | A1* | 6/2003 | Khan | ................. G06F 15/7842 709/201 |
| 2019/0180170 | A1* | 6/2019 | Huang | ................ G06F 13/4068 |
| 2020/0104692 | A1* | 4/2020 | Hill | ........ G06F 7/5443 |
| 2020/0151088 | A1* | 5/2020 | Gu | ........ G06F 30/343 |

* cited by examiner

*Primary Examiner* — Marina Lee
(74) *Attorney, Agent, or Firm* — Womble Bond Dickinson (US) LLP (57) ABSTRACT

Embodiments of the invention disclose an integrated circuit and a method for improving utilization of multiply and accumulate (MAC) units on the integrated circuit in an artificial intelligence (AI) engine. In one embodiment, the integrated circuit can include a scheduler for allocating the MAC units to execute a neural network model deployed on the AI engine to process input data. The scheduler includes status information for the MAC units, and can select one or more idle MAC units based on the status information for use to process the feature map slice. The integrated circuit can dynamically map idle MAC units to an input feature map, thereby improving utilization of the MAC units. A pair of linked list, each with a reference head, can be provided in a static random access memory (SRAM) to store only feature map slices and weights for a layer that is currently being processed. When processing a next layer, the two reference heads can be swapped so that output feature map slices for the current layer can be used as input feature maps for the next layer.

21 Claims, 9 Drawing Sheets

METHODS FOR IMPROVING AI ENGINE MAC UTILIZATION

TECHNICAL FIELD

Embodiments of the present disclosure relate generally to artificial intelligence (AI) engines. More particularly, embodiments of the disclosure relate to multiplier-accumulator (MAC unit) utilization in an AI engine.

BACKGROUND

As a branch of artificial intelligence (AI), machine learning can perform a task without using an application specifically programmed for the task. Instead, machine learning can learn from past examples of the given task during a training process, which typically involves learning weights from a dataset.

A machine learning model (e.g., a neural network model) can perform a task on input data through inference. During the inference, features can be extracted from the input data and compared to a score using a classifier for making predictions and providing results. Feature extraction and classification can be computationally intensive, and can include computing dot products of features and weights for each layer in the model. Therefore, when a machine learning model is running on an AI engine, a large number of multiply and accumulate (MAC) operations need to be performed by the AI engine.

An AI engine can include multiple MAC units, which are hardware units or blocks for performing MAC operations. Before a machine learning model is deployed on an AI engine for execution, a mapping tool can be used to generate a metafile from the model to specify static mappings between each layer in the model with MAC units in the AI engine. The static mappings can lead to a lower utilization rate of MAC units in the AI engine.

For example, when a slice of input feature map requires a number of MACs that is not multiple of the total MAC units in an AI engine, some MACs can be idle. The idle MACs cannot be used to process a next slice of the input feature map due to the static mappings. For another example, due to the sparsity of feature maps, the MAC units may complete tasks unevenly, leaving some MAC units idle. Even for MAC units statically mapped to a feature map slice, one or more MAC units may have to wait due to latency in data fetch or instruction fetch.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As described above, static mappings between different layers of a neural network model and MAC units in an AI engine can cause low utilization of the MAC units. According to various embodiments, dynamic mappings between different layers of a neural network model and MAC units in an AI engine can be used to improve the utilization of the MAC units. In one embodiment, an integrated circuit can include multiple MAC units; and a scheduler for allocating the MAC units to execute a neural network model deployed as a part of an artificial intelligence (AI) engine to process input data, the scheduler maintaining status information for the plurality of MAC units. In response to receiving a slice of a feature map extracted from the input data, the scheduler is to select one or more idle MAC units from the MAC units based on the status information for use to process the feature map slice.

In one embodiment, a method for improving utilization of MAC units on an integrated circuit in an AI engine can include receiving, by a scheduler on the integrated circuit, a slice of a feature map extracted from input data provided to a neural network model deployed on the AI engine, the scheduler including status information for the MAC units; in response to receiving the feature map slice, selecting one or more idle MAC units from the MAC units based on the status information; and processing the feature map slice using the one or more selected idle MAC units.

In one embodiment, the scheduler includes a scheduler map with a bit array, and each element of the bit array includes a bit indicating whether a corresponding MAC unit is idle or busy. The scheduler can set a corresponding bit in the bit array to mark a MAC unit as busy when that MAC unit is allocated to a feature map slice, and to reset the corresponding bit to mark the MAC unit as idle when each processing element (PE) in that MAC unit has completed its allocated computation. Before scheduling a feature map slice for execution on the AI engine, the scheduler can check the scheduler map to determine that processing capabilities of idle MAC units on the integrated circuit are sufficient for processing the feature map slice. The scheduler is an O (1) scheduler, which can be a hardware scheduler implemented in the plurality of MAC units or a software scheduler implemented in a double data rate synchronous dynamic random-access memory (DDR DRAM) on the integrated circuit.

In one embodiment, the one or more MAC units can be selected from the longest continuous idle MAC units on the integrated circuit. The continuity of the selected MAC units can be based on the locations of their corresponding bits in the bit array, and can indicate their physical closeness the integrated circuit.

In one embodiment, the integrated circuit includes a static random access memory (SRAM) that stores input feature maps, output feature maps, and weights for a current layer of the neutral network model. A current layer is a layer that is currently being processed by the AI engine. Slices of an input feature map for the current layer can be chained with a first head to create a first linked list. After a slice of the input feature map has been processed by the AI engine, the input feature map slice can be removed from the first linked list. A corresponding output feature map slice can be generated by the AI engine after it completes processing the input feature map slice. The corresponding output feature map slice can be chained to a second head to create a second linked list for the current layer. When a last slice of the input feature map for the current layer is processed, the first head can be swapped with the second head so that output feature map slices for that layer in the second linked list can be provided as input feature map slices for a next layer of the neural network model.

In various embodiments, linked lists or other chained data structures used to track feature map slices do not require the chained feature map slices to be adjacent to each other, thereby enabling the AI engine to better utilize the SRAM without physically partitioning the SRAM for storing input feature maps, output feature maps and weights maps for the current layer. The use of an O (1) scheduler map to schedule the computation with idle MAC units can improve utilization of MAC units the AI engine, thereby increasing the scalability and efficiency of the AI engine.

The above summary does not include an exhaustive list of all embodiments in this disclosure. All integrated circuits and methods can be practiced from all suitable combinations of the various aspects and embodiments described in the disclosure.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
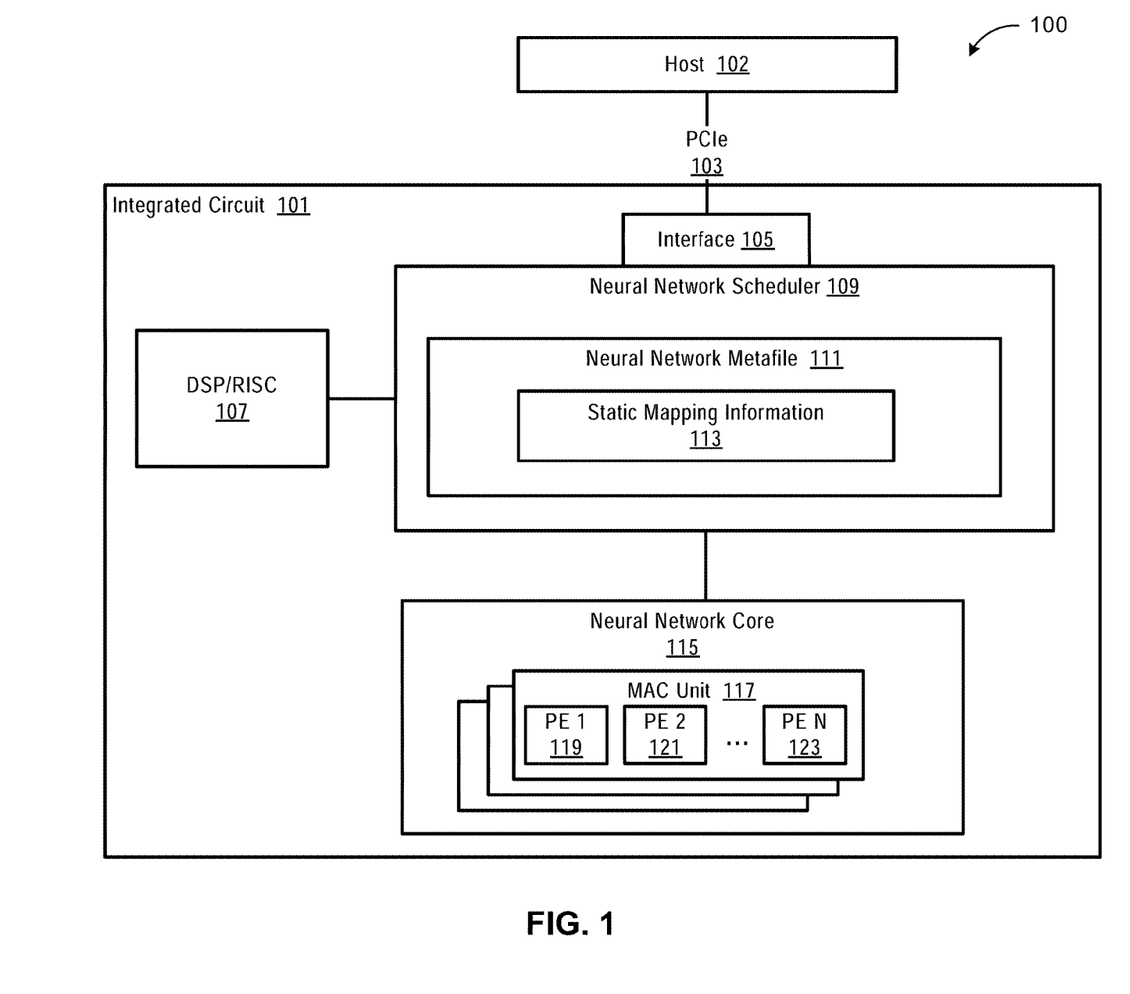
FIG. 1 illustrates an example of an AI engine in accordance with an embodiment.

FIG. 1 illustrates an example of an AI engine 100 in accordance with an embodiment. As shown in FIG. 1, the AI engine 100 can include an integrated circuit 101 with a neural network core 115 and one or more processors thereon, for example, a reduced instruction set computer (RISC) or a digital signal processor (DSP) 107. The neural network core 115 can be an independent processing unit that includes multiple MAC units (e.g., 256 MAC units), each MAC unit including multiple processing elements (PE). For example, MAC unit 117 can include PE 1 119, PE 2 121 and PEN 124. The PEs in the MAC unit 117 can be arranged in a systolic array, and each PE can have some glue logic to store and forward data to work in lock steps with its neighboring PEs.

In one embodiment, each MAC unit in the neutral network core 115 can be a 3-dimensional tensor computation unit. Accordingly, the PEs in that MAC unit can be arranged in a 3-dimensional systolic array. Each MAC unit can be a hardware unit that performs both multiplication and addition functions.

In one embodiment, the integrated circuit 101 can include multiple neural network cores similar to the neural network core 115. Similarly, multiple integrated circuits similar to the integrated circuit 101 can be attached to a host 102 via peripheral component interconnect express (PCIe) buses similar to PCIe 103. One or more mapping tools can be applied to a neutral network model to generate mapping information between each layer of the network model and the MAC units in the AI engine 100 (also referred to as a data processing engine). When a particular layer is mapped to one or more MAC units, the mapped MAC units will be allocated for processing the layer. The mapping information can be stored in a metafile.

In one embodiment, a neural network model with such mapping information in a metafile can be deployed on the host 102. During runtime, a neural network scheduler 109 can retrieve the metafile (e.g., neural network metafile 111) via an interface 1095, and use the static mapping information (e.g., static mapping information 113) in the metafile to allocate MAC units from one or more neural network cores (e.g., neural network core 115) in the AI engine 100. The allocated MAC units can perform addition and accumulation operations for each layer of the neural network model. The neural network scheduler 109 can delegate those computations that cannot be handled by the MAC units to the DSP or RISC 108.

In one embodiment, the neural network model can be a deep neural network (DNN) that includes a deep hierarchy of layers for better performance. The hierarchy of layers can include multiple convolutional (CONV) layers and one or more fully-connected (FC) layers. With each CONV layer, a higher-level abstraction of the input data can be extracted to preserve essential yet unique information of the input data. The higher-level abstraction of the input data is a feature map extracted from the input data. Each layer can take a feature map as an input and generate an output feature map, which in turn can be provided to a next layer as an input feature map. The output feature map of the final CONV layer in the neural network model can be processed by the FC layers for classification purposes. Between the CONV layers and the FC layers, additional layers can be added, such as pooling and normalization layers. Each CONV layer or FC layer can also be followed by an actitation layer, such as a rectified linear unit (ReLU).

In one embodiment, an input feature map for a CONV layer can be sliced into multiple slices, which can be mapped to different sets of the MAC units in the AI engine 100. Accordingly, the corresponding output feature map also includes multiple feature map slices. Due to the static mapping information, the neural network scheduler 109 has to process one input feature map slice at a time. In one embodiment, the neural network scheduler 109 would not start to allocate hardware resources (e.g., MAC units) to process a next feature map slice before the processing of the current feature map slice is completed, which can cause low utilization of the MAC units. Similarly, the neural network scheduler 109 would not start to allocate hardware resources to process a next layer before the processing of the current layer is completed.

As an illustrative example, an AI engine has 256 MAC units, and an input feature map slice for a particular CONV layer of the neural network model requires the computation power of 1124 MAC units. In this example, 124 MAC units (1124 mode 256) could be idle for a period of time. The idle time could be longer if the training neural network model is a sparsity network. For example, if a feature map of a layer of the sparsity network requires 20 MAC units, a total of 236 MAC units would be idle before the feature map of the layer is completely processed.

The low utilization of the MAC units can be also caused by latency in data fetch and instruction fetch. When a set of MACs is statically mapped to a feature map slice, some MAC units in the set of MAC units may depend on other MAC units for data or instructions, and therefore have to wait until the other MACs complete their assigned tasks. The waiting MAC units are therefore idle.

As in a typical DNN, convolutions may account for a majority portion of the computation requirement of the neural network model. Therefore, the utilization of the MAC units in the AI engine 100 may have a major impact on the performance of the AI engine 100.

Figure 2:
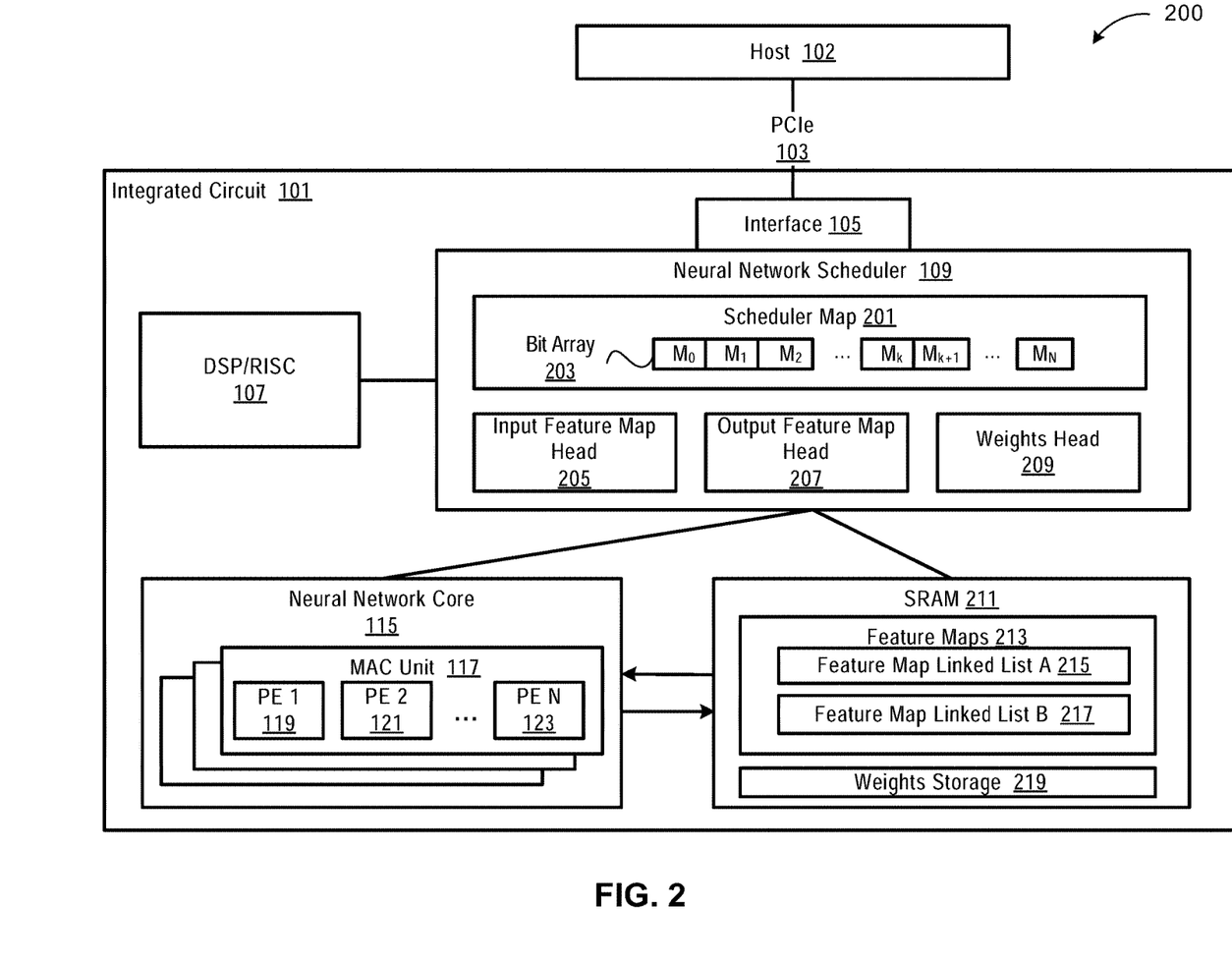
FIG. 2 illustrates an example of an integrated circuit for improving utilization of MAC units in an example AI engine in accordance with an embodiment.

FIG. 2 illustrates an example of an integrated circuit for improving utilization of MAC units in an example AI engine 200 in accordance with an embodiment. As shown in FIG. 2, the neural network scheduler 109 on the integrated circuit 101 can include a scheduler map 201, for providing dynamic mappings between a neural network model and the MAC units in the AI engine 200. The scheduler can be an O (1) scheduler, which can be a hardware scheduler implemented in the plurality of MAC units or a software scheduler implemented in an DDR DRAM on the integrated circuit.

An O(1) scheduler is a kernel scheduling design that can schedule processes within a constant amount of time, regardless of how many processes are running on the operating system. This is an improvement over previously used O(n) schedulers, which schedule processes in an amount of time that scales linearly based on the amounts of inputs. In the realm of real-time operating systems, deterministic execution is key, and an O(1) scheduler is able to provide scheduling services with a fixed upper-bound on execution times.

The algorithm used by the O(1) scheduler relies on active and expired arrays of processes to achieve constant scheduling time. Each process is given a fixed time quantum, after which it is preempted and moved to the expired array. Once all the tasks from the active array have exhausted their time quantum and have been moved to the expired array, an array switch takes place, Because the arrays are accessed only via a pointer, switching them is as fast as swapping two pointers. This switch makes the active array the new empty expired array, while the expired array becomes the active array. An O(1) algorithm is guaranteed to complete in a certain amount of time regardless of the size of the input.

In the example as shown in FIG. 2, the neural network model does not need to rely on a mapping tool to generate a metafile offline as described above. Instead, a bit array 203 can include a corresponding bit for each MAC unit in the AI engine 200. The corresponding bit can be set and reset to indicate whether the MAC unit is busy or idle. The neural network scheduler 109 can mark a MAC unit as BUSY when the MAC unit is allocated to a feature map slice, and mark the MAC unit as IDLE when each PE in the MAC unit has completed its allocated computation.

Without a static mapping between a feature map slice and any MAC unit, the neural network scheduler 109 can dynamically allocate one or more MAC units to a particular feature map slice based on their availability. When the required number of MAC units is not a multiple of the preconfigured MAC units in the AI engine 200 (1124 required MAC units vs. 256 preconfigured MAC units), the 124 MAC idle MAC units can be scheduled to process a feature map slice from a next layer of the neural network model. When the neural network model is a sparsity network, the idle MAC units can be scheduled to process other layers that are dependent on an inference result of the feature map currently being processed. When MAC units are idle due to unsynchronized completion status caused by latency in data fetch or instruction fetch, the MAC units do not have to wait until the other MAC units complete their allocated tasks. The neural network scheduler 109 can allocate the idle MAC units to other feature map slices in the same layer of the neural network model.

As further shown in FIG. 2, the integrated circuit 101 can include a SRAM 211 to store feature maps 213 of the neural network model. The feature maps 213 does not include input feature maps and output feature maps for all layers of the neural network model at the same time. Instead, the feature maps 213 stores only input feature map slices, output feature map slices, and weights for the current layer. As the execution of the neural network model progresses to a next layer, weights for the next layer can be retrieved from an external storage (e.g., a DRAM) on the host 102 or another external storage, and loaded into the weights storage 219 in the SRAM 211.

In one embodiment, a pair of chained data structures can be provided for the current layer. Feature map linked list A 215 and feature map linked list B 217 are examples of the chained data structures.

In one embodiment, the neural network scheduler 109 can maintain an input feature map head 205 and an output feature map head 207, which are references and entry points respectively to the feature map linked list A 215 and the feature map linked list B 217. The neural network scheduler 109 also includes a weights head 209, which can be a reference to a weights storage 219 for the current layer. The weighs storage 219 can be a memory location or a data structure 219 in the SRAM 211 for storing weights of the current layer.

In one embodiment, before starting to schedule MAC units to process a particular layer of the neural network model, the neural network scheduler 109 can chain input feature map slices for that layer to the input feature map head 205 to create the feature map linked list A 215. After a feature map slice is processed, it can be removed from the linked list 215. Once an output feature map slice for the current layer is generated, it can be chained by the neural network scheduler 109 with the output feature map head 207 to create the feature map linked list B 217, which can chain all feature map slices for the current layer together. When processing the current layer, the associated weights can also be loaded from the weights storage 219 into the neural network core 115 for processing.

When the last layer of the neural network model is processed, the input feature map head 205 and the output feature map head 207 can be swapped, so that the input feature map head 205 points to the feature map linked list B 217 and the output feature map head 207 points to the feature map linked list A 215. The feature map linked list A 215 can be empty since all the input feature map slices for the current layer have been removed, while the feature map linked list B 217 can include a chain of feature maps at a higher level.

In one embodiment, the swapping would enable the neural network scheduler 109 to use the output feature map slices for the current layer as input feature map slices for a next layer, and to use the emptied-out linked list A 215 as output feature map slices for the next layer.

By maintaining two linked lists and one memory location for storing input feature map slices and output feature map slices for only one CONV layer of the neutral network model, the AI engine 200 can substantially reduce SRAM usage. Further, since the linked lists do not require their elements to be adjacent to each other, and their swapping does not need copying, the SRAM 211 can be better utilized without being physically partitioned into different areas for input feature maps, output feature maps and weights for the current layer.

Figure 3:
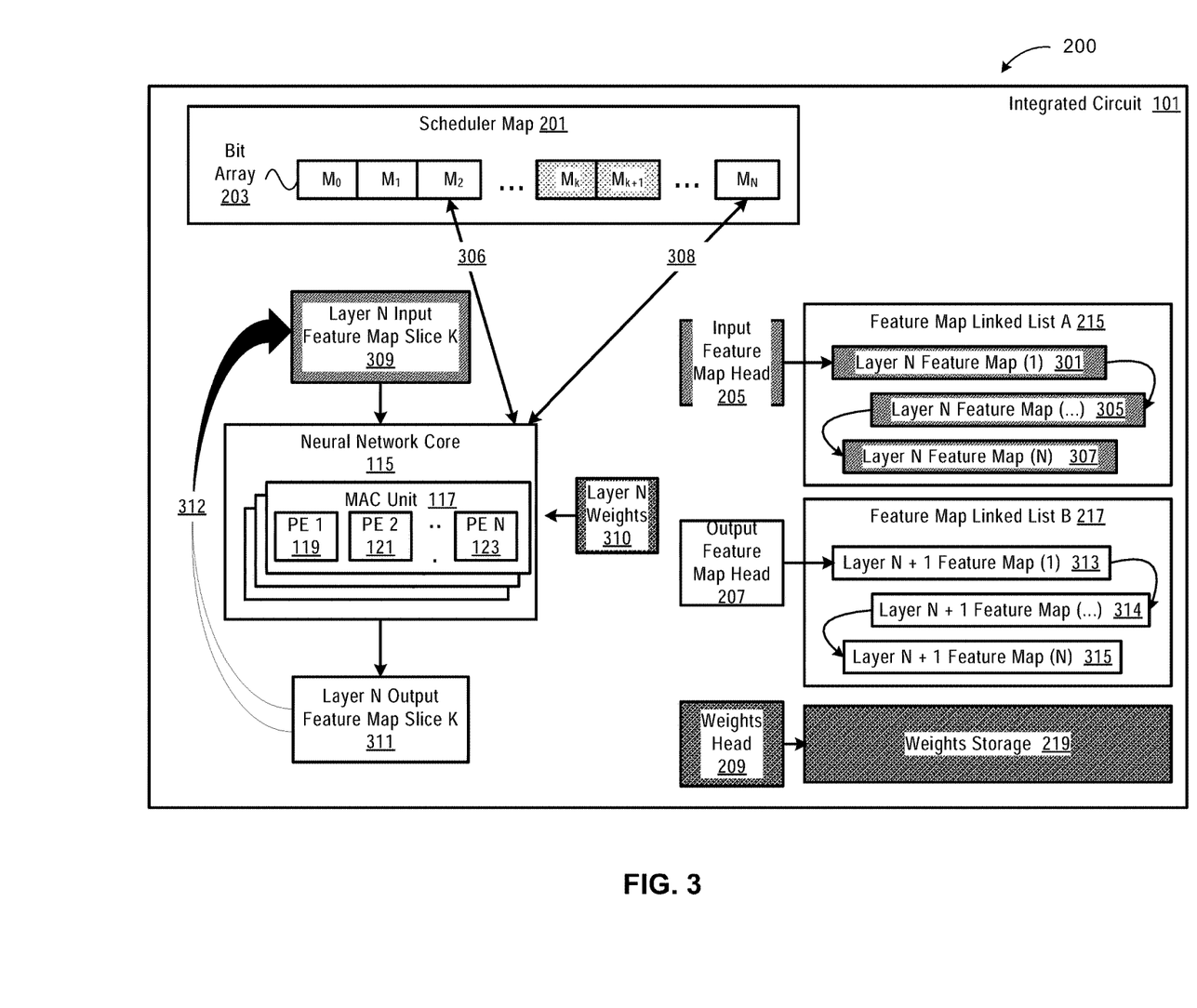
FIG. 3 further illustrates an integrated circuit for improving utilization of MAC units in an example AI engine in accordance with an embodiment.

FIG. 3 further illustrates an integrated circuit for improving utilization of MAC units in an example AI engine 200 in accordance with an embodiment. In this illustrative example, the input feature map head 205 points to the feature map linked list A 215, which represents chained input feature map slices 301, 305 and 307 for the layer N of a neural network model. The output feature map head 207 points to the feature map linked list B 217. Although the feature map linked list B 217 includes output feature map slices for the layer N, these output feature map slices can be used as input feature map slices 313, 314, and 315 for the layer N+1.

As further shown, the neural network core 115 can process an input feature map slice K 309 for the current layer and weights 310 retrieved from the weights storage 219 for the current layer to generate a corresponding output feature map slice K 311. The input feature map slice K 309 can be retrieved from the feature map linked list A 215, and can be removed from the linked list 215 after being processed. Similarly, the output feature map slice K 311 can be added to the feature map linked B list 217 and can be represented by one of the feature map slices 313, 314, and 315 therein. The output feature map slice K 311 can be swapped 312 to be an input feature map slice for the Layer N+1 after each input feature map slice for the layer N is processed.

In one embodiment, the neural network scheduler 109 (as shown in FIG. 2) can monitor 306 and 308 the scheduler map 201 to determine which MAC units are idle and which MAC units are busy based on status information of each MAC unit indexed by the bit array 203. The neural network scheduler 109 can also update 306 and 308 the status information for a MAC unit by resetting its corresponding bit in the bit array 203 when the status of the MAC unit has changed.

For example, based on the bit array 203, some MAC units (e.g., as indicated by the indexes $M_0$, $M_1$, $M_2$ in the bit array 203) are idle. The idle MAC units can be scheduled to process another input feature map slice other than the input feature map slice K 309 for the Layer N, or an input feature map slice for the Layer N+1. A first separate reference head (other than the input feature map head 205 and the output feature map head 207) can be used by the neural network scheduler 109 to access the linked list 215 from its rear end to retrieve an input feature map slice for the idle MAC units to process. Similarly, a second separate reference head (other than the input feature map head 205 and the output feature map head 207) can be used by the neural network scheduler 109 to access the linked list 217 from its rear end to retrieve an output feature map slice, which the idle MAC units can process as an input feature map slice for the layer N+1.

In one embodiment, when scheduling idle MAC units in the AI engine to process another input feature map slice for the layer N or the layer N+1, the neural network scheduler 109 can check all the idle MAC units in the AI engine, and aggregate a sufficient number of idle MAC units. One way to determine the number of aggregated idle MAC units is to use the following rule: processing power of the aggregated idle MAC unit needs to be equal or bigger than the processing power needed for processing the input feature map slice and the associated weights. The processing power for each MAC unit can be determined based on the hardware configuration of the MAC unit. The processing power requirement for processing an input feature map slice and the weights can be dynamically calculated based on the size of the input feature map slice.

In one embodiment, when selecting idle MAC units to be aggregated, the neural network scheduler 109 can search for the longest continuous idle MAC units (e.g., 10 idle MAC units in a row without any busy MAC unit in between) in the AI engine based on the status information in the bit array 203, an can select one or more idle MAC units from the longest continuous MAC units block. If the idle MAC units in the longest continuous block do not have the processing power needed to process the given input feature map slice, the neural network scheduler can continue to search for the next longest continuous idle MAC units (e.g., 3 idle MAC units in a row without any busy MAC unit in between). The above process can be repeated until a desired number of idle MAC units are selected. If no idle MAC units are adjacent to each other, the neural network scheduler 109 can select any idle MAC units from the beginning of the bit array 203 until the desired number of idle MAC units are selected.

In one embodiment, the continuity of MAC units can be determined based on the locations of their corresponding bits in the bit array 203, where adjacent array elements indicate physical adjacency of the corresponding MAC units in the AI engine.

Figure 4A:
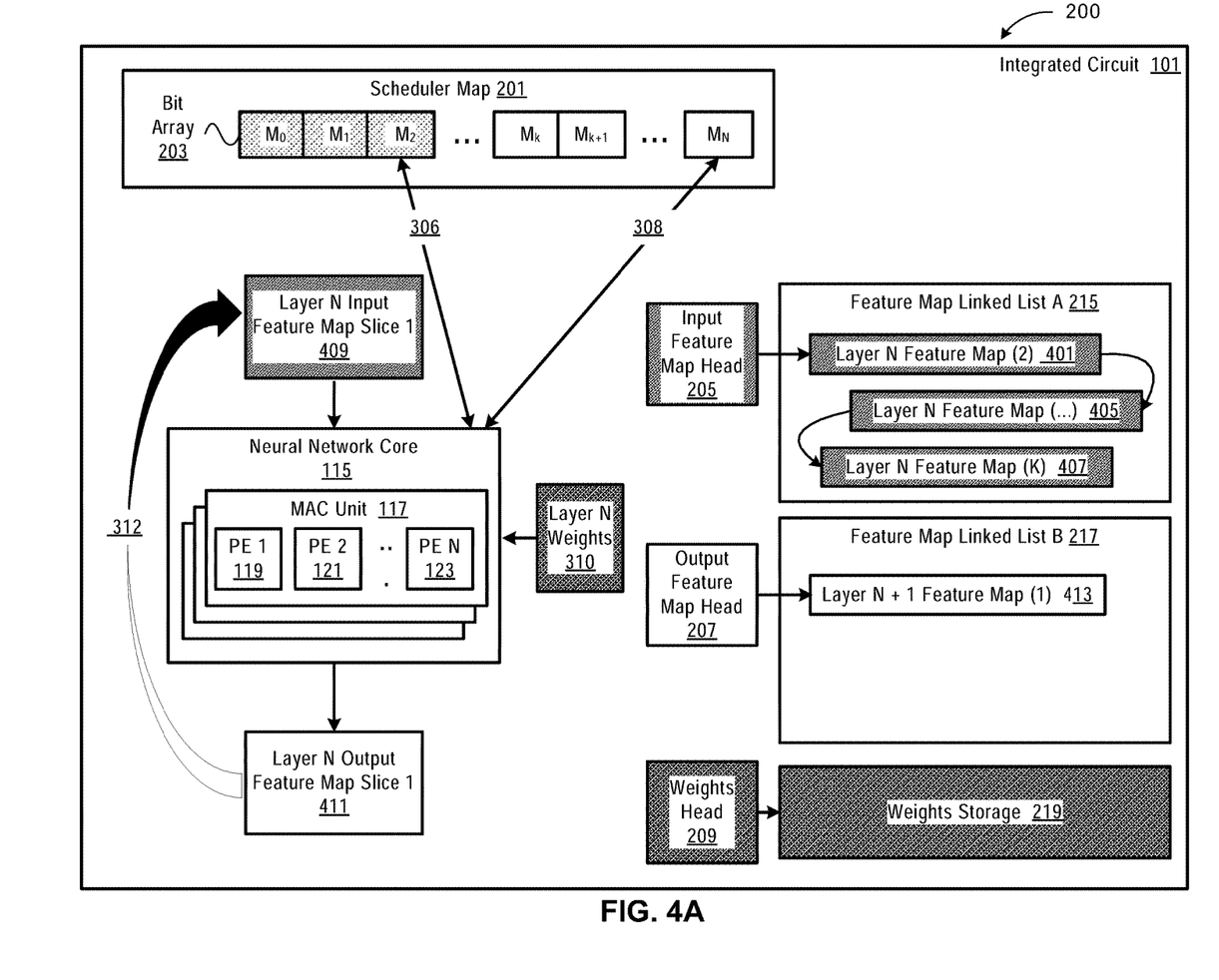
FIGS. 4A-4D illustrate the processing of input feature map slices for the layer N by an example AI engine in accordance with an embodiment.

FIGS. 4A-4D illustrate the processing of input feature map slices for the layer N by an example AI engine in accordance with an embodiment. Referring to FIG. 4A, the first input feature map slice 409 for the layer N is processed by the neutral network core 115, and is removed from the feature map linked list A 215. Therefore, other input map slices 401, 405 and 407 remain in the linked list 215. A first output feature map slice 413 for the layer N is generated and is chained with the output feature map head 207 to become the first element in the feature map linked list B 217. Some MAC units (e.g., those indexed by $M_0$, $M_1$, and $M_2$) are busy processing the input feature map slice 1 for the layer N, while some other MAC units (e.g., those indexed by $M_k$, $M_{k+1}$, and $M_N$) are idle. The idle MAC units can be allocated to process one or more other input feature map slices for the layer N.

Figure 4B:
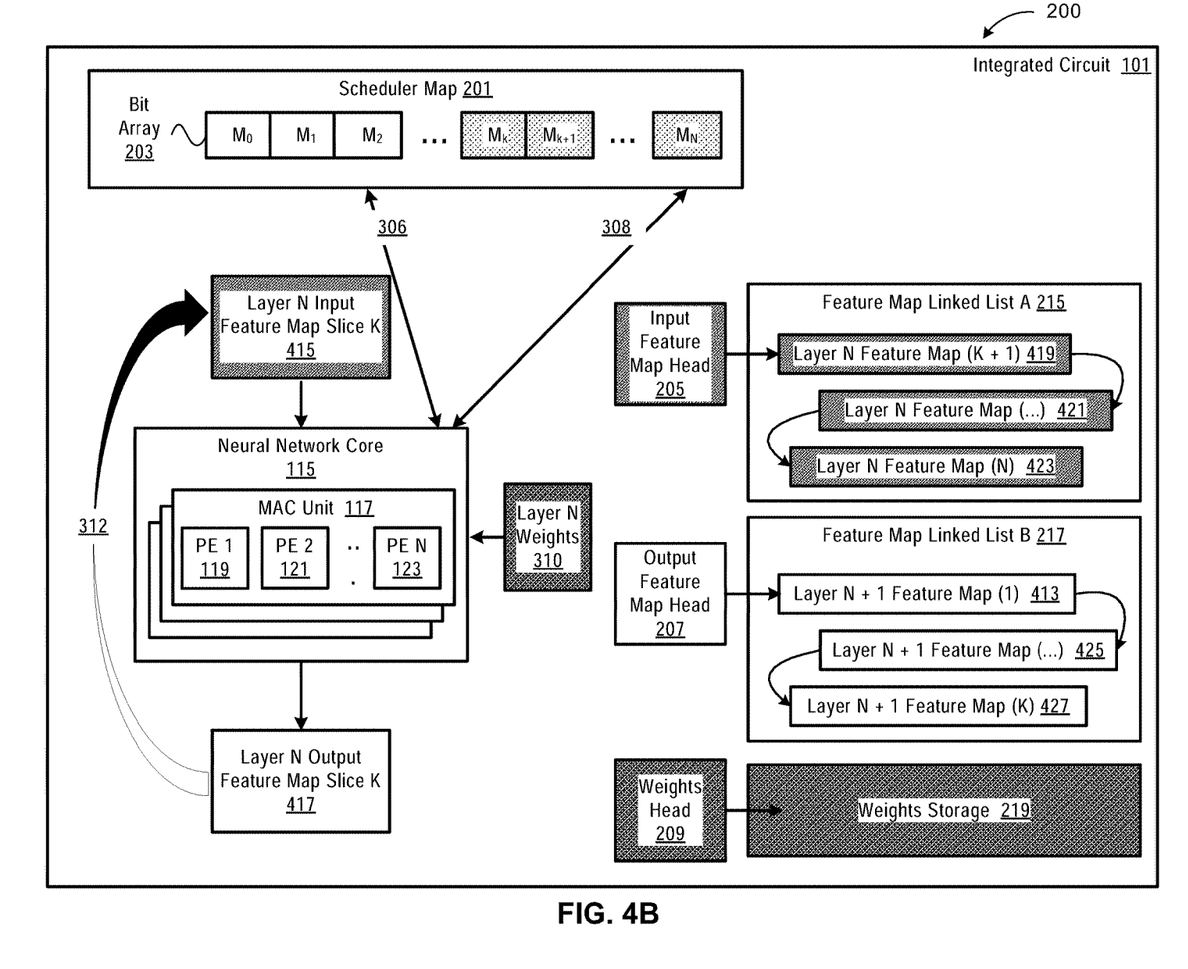

Referring to FIG. 4B, the neutral network core 115 processes input feature map slice K 415, and generate output feature map slice K 417. As shown, the feature map linked list A 215 does not contain the input feature map slices from 1 to K, and only input feature map slices 419, 421, and 423 from K+1 to N since the input feature map slices from 1 to K have been removed from the linked list 215 after being processed. Corresponding output feature map slices 413, 425, and 427 to the input feature map slices that have been processed can be found in the feature map linked list B 217. In FIG. 4B, a different set of MAC units (e.g., those indexed by $M_0$, $M_1$, and $M_2$) are idle.

Figure 4C:
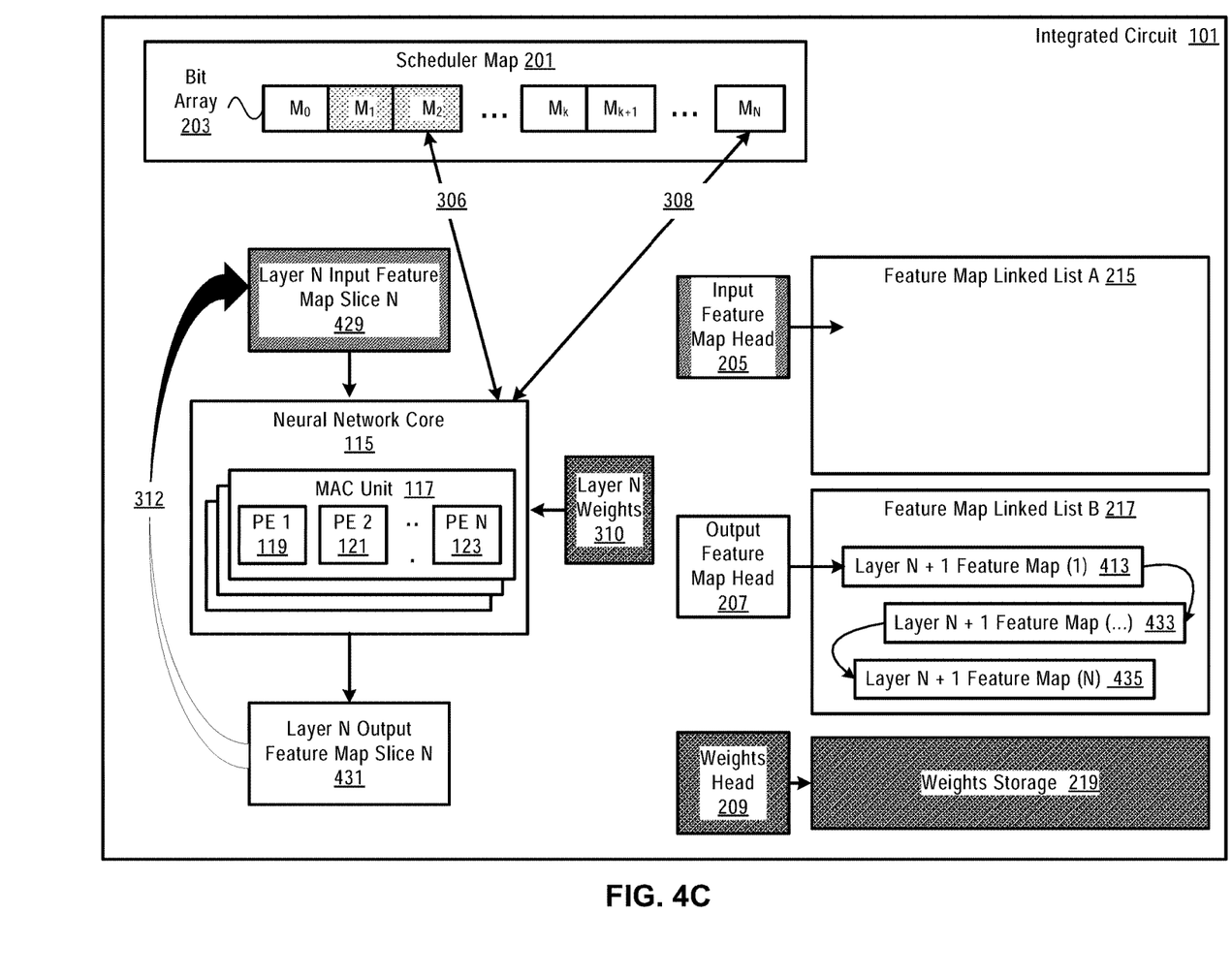

Referring to FIG. 4C, the neutral network core 115 processes the last input feature map slice N 429 for the layer N, and generates the last output feature map slice N 431. As shown, the feature map linked list A 215 is empty since all input feature map slices for the layer N have been processed and removed from the linked list 215. The feature map linked list B 217 includes all the output feature map slices 413, 433, and 435 for the layer N.

Figure 4D:
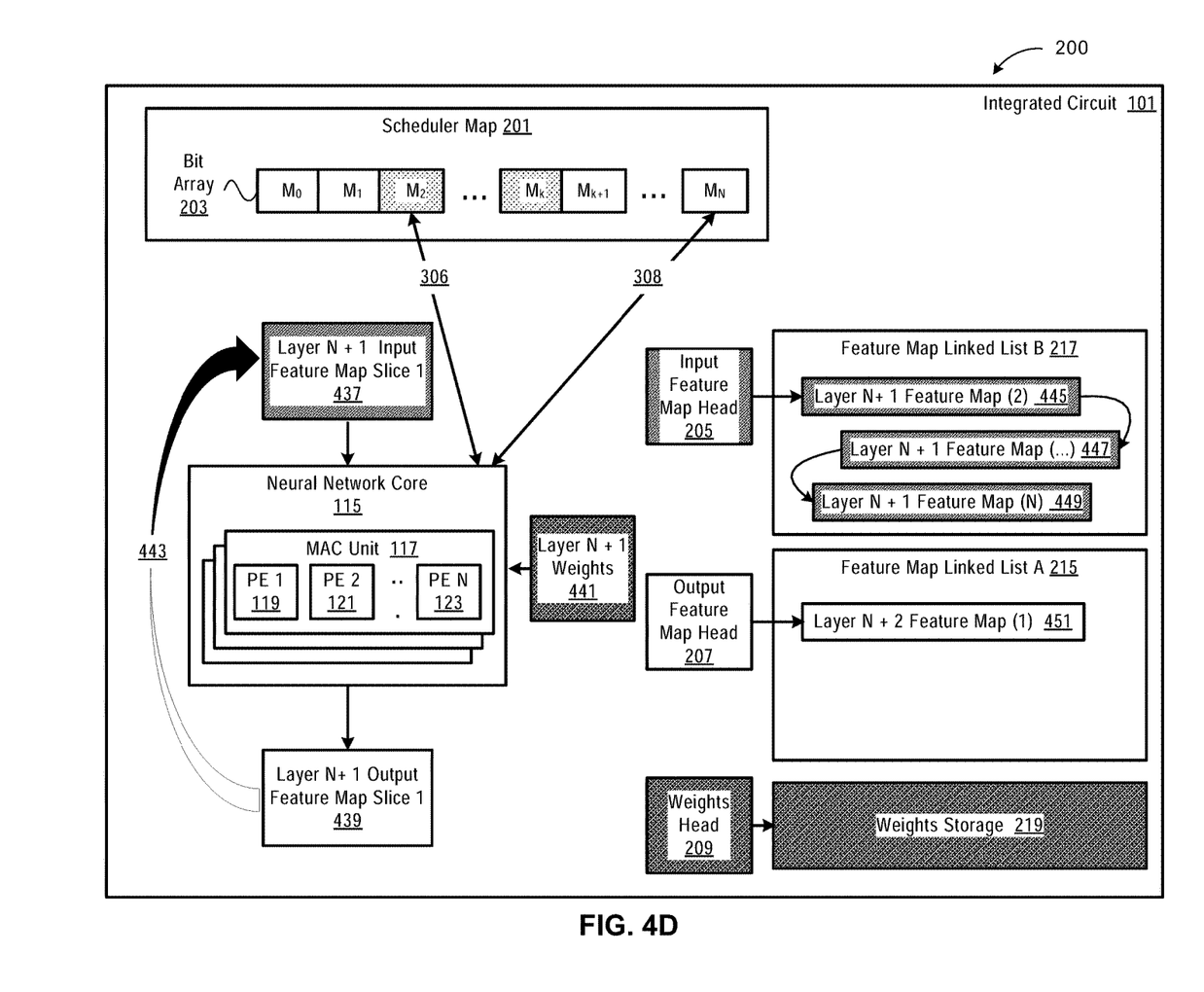

Referring to FIG. 4D, the neural network core 115 starts to process input feature map slices for the layer N+1 after the neural network scheduler 109 swaps the input feature map head 205 and the output feature map head 207 and loads weights 441 for the layer N+1 from an external memory (e.g., a DDR memory) to the SRAM 211 (as shown in FIG. 2). As shown, the first input feature map 437 for the layer N+1 and the weights 441 for the layer N+1 can be loaded from the weights storage 219, and provided to the neural network core 115. The neural network core 115 can generate the first output feature map slice 439 for the layer N+1. The output feature map slice 439 can be chained with the output feature map head 207 to become the first element 451 in the feature map linked list A 215. The linked list A 215 been emptied out by the neural network scheduler 109 after the neural network core processes all the input feature map slices for the layer N. The first output feature map slice 439 for the layer N+1 can be swapped 443 and can be used as an input feature map slice for the layer N+2.

As further shown in FIG. 4D, the first input feature map slice 437 has been removed from the feature map linked list A 215, which still contains the input feature map slices 445, 447 and 449 that have not been processed.

Figure 5:
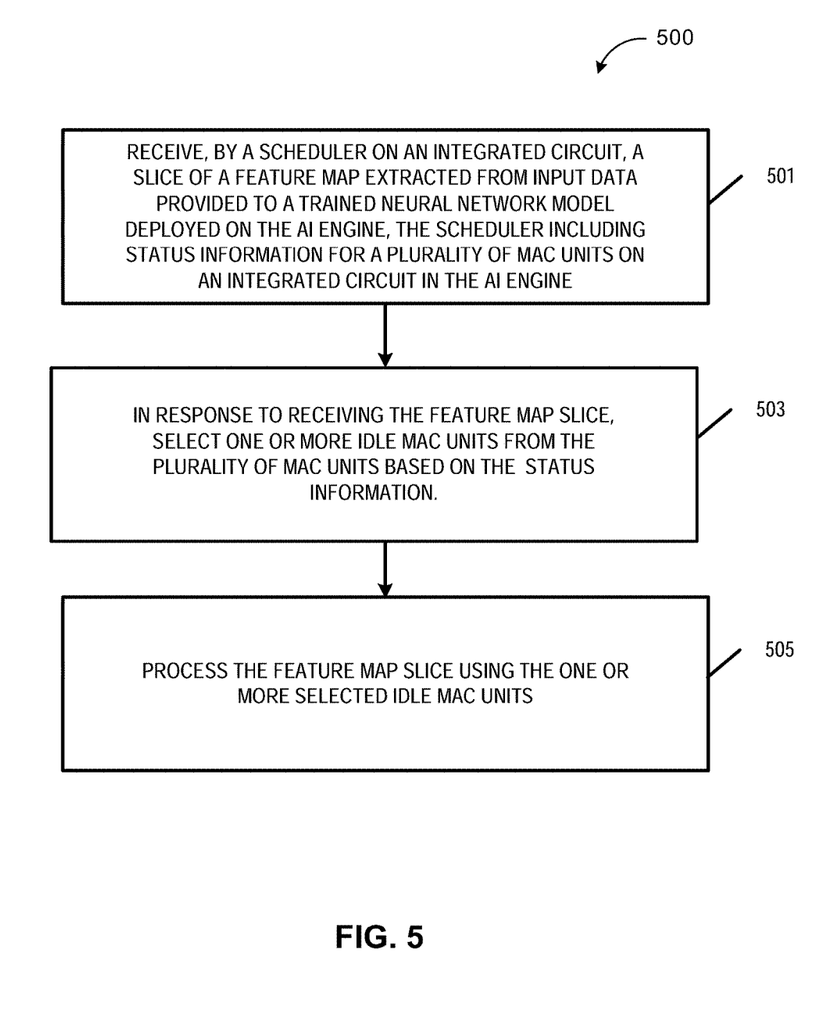
FIG. 5 illustrates a flow diagram illustrating an example process of improving utilization of MAC units in an AI engine in accordance with an embodiment.

FIG. 5 illustrates a flow diagram illustrating an example process of improving utilization of MAC units in an AI engine in accordance with an embodiment. Process 500 may be performed by processing logic which may include software, hardware, or a combination thereof. Process 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 500 may be performed by one or more of components, e.g., the neural network scheduler 109 illustrated in FIG. 2, FIG. 3, and FIGS. 4A-4C.

Referring to FIG. 5, in operation 501, a neural network scheduler in an AI engine receives a slice of a feature map extracted from input data provided to a neural network model deployed on the AI engine. The neural network scheduler includes status information for MAC units on an integrated circuit in the AI engine. The neutral network scheduler can be implemented in hardware or in software. Each MAC unit can have a corresponding bit in a bit array in the neural network scheduler. The bit can be set or reset to indicate whether that MAC unit is busy or idle.

In operation 503, the neural network scheduler selects one or more idle MAC units from the integrated circuit based on the status information in response to receiving the feature map slice. The one or more MAC units can be selected from the longest continuous idle MAC units. The neural network scheduler can use a predetermined algorithm to calculate the processing capability requirement of the input feature map slice, and determine the processing power of each MAC, so that a sufficient number of idle MAC units can be selected to meet the processing requirement of the input feature map slice and the associated weights.

In operation 505, the neural network scheduler allocates the one or more selected idle MAC unit to process the input feature map slice. While the AI engine is processing the input feature map slice, the neural network scheduler can update the scheduler map to mark the one or more selected MAC units as busy.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
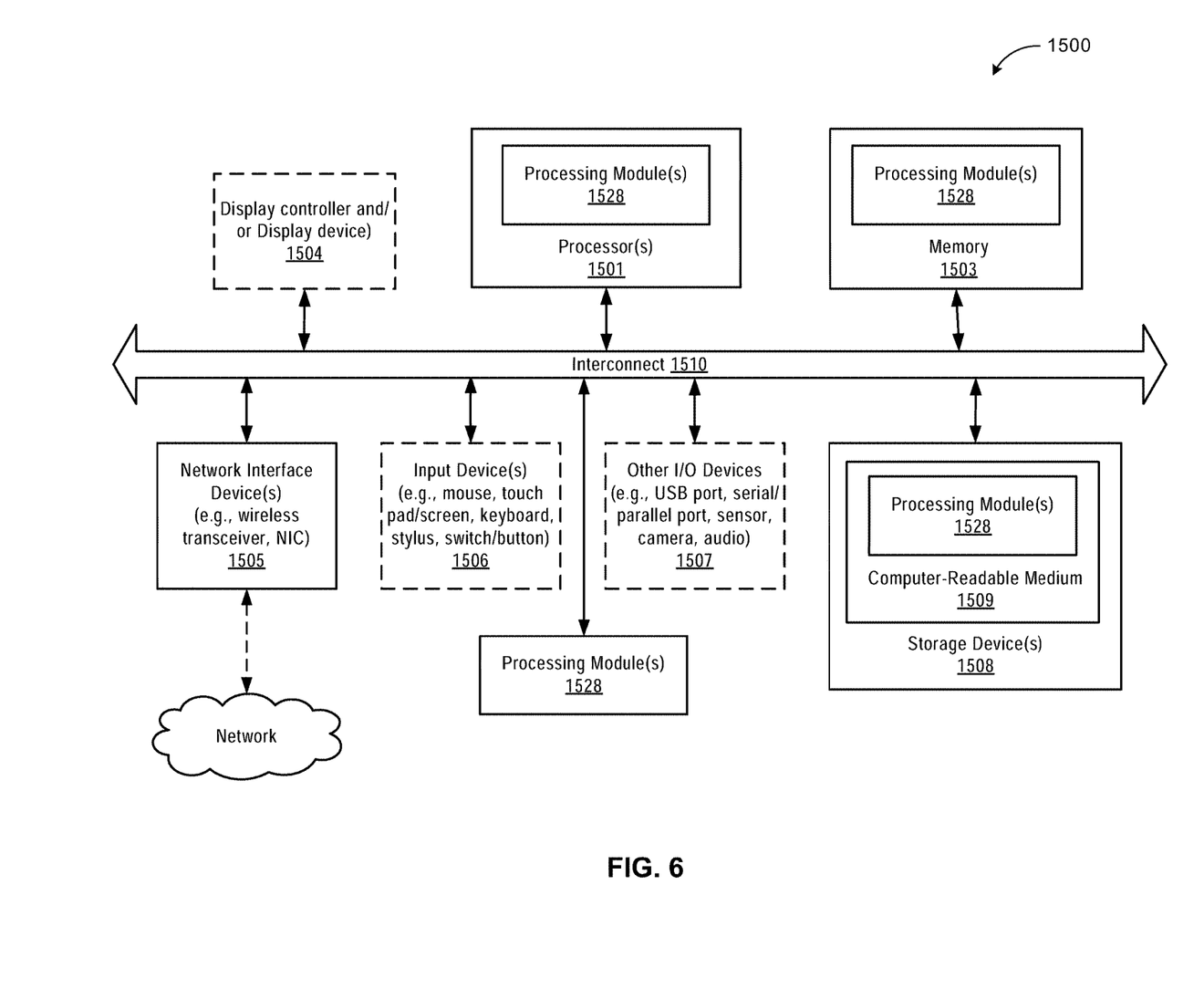
FIG. 6 is a block diagram illustrating an example of a data processing system which may be used with one embodiment.

FIG. 6 is a block diagram illustrating an example of a data processing system which may be used with one embodiment of the disclosure. For example, system 1500 may represent any of data processing systems described above performing any of the processes or methods described above, such as for example, host 102. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, the neural network scheduler 109. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. An integrated circuit, comprising:
a plurality of multiply and accumulate (MAC) units; and
a scheduler coupled to the plurality of MAC units to manage and allocate at least a portion of the plurality of MAC units to execute a neural network model deployed as a part of an artificial intelligence (AI) engine to process input data, the scheduler maintaining status information of the plurality of MAC units,
wherein in response to receiving a slice of a feature map extracted from the input data, the scheduler is to select one or more MAC units from the plurality of MAC units based on the status information corresponding to the one or more MAC units selected to process the slice of the feature map.

2. The integrated circuit of claim 1, wherein the scheduler includes a scheduler map with a bit array, with each element of the bit array corresponding to an MAC unit of the plurality of MAC units and including a bit indicating whether the MAC unit is idle or busy.

3. The integrated circuit of claim 2, wherein the scheduler is to set a corresponding bit in the bit array to mark one of the plurality of MAC units as busy when that MAC unit is allocated to the slice of the feature map, and to reset the corresponding bit to mark the MAC unit as idle when each of a plurality of processing elements (PE) in that MAC unit has completed its allocated computation.

4. The integrated circuit of claim 1, wherein the scheduler is to check a scheduler map to determine that processing capabilities of idle MAC units in the integrated circuit are sufficient for processing the slice of the feature map before scheduling the slice of the feature map for execution on the AI engine.

5. The integrated circuit of claim 1, wherein the one or more MAC units are selected from a longest continuous idle MAC units on the integrated circuit, wherein a continuity of the one or more MAC units is based on locations of their corresponding bits in a bit array and indicates their physical closeness on the integrated circuit.

6. The integrated circuit of claim 1, wherein the scheduler is an O (1) hardware scheduler implemented in the plurality of MAC units or an O (1) software scheduler implemented in a dynamic random-access memory on the integrated circuit.

7. The integrated circuit of claim 1, further comprising:
a static random access memory (SRAM) to store input feature maps, output feature maps, and weights for each of a plurality of layers of the neural network model.

8. The integrated circuit of claim 7, wherein a plurality of slices of an input feature map for a current layer of the neural network model are chained with a first head to create a first linked list, and wherein after a slice of the input feature map has been processed by the AI engine, the slice of the input feature map is to be removed from the first linked list.

9. The integrated circuit of claim 8, wherein a corresponding output feature map slice to the input map slice is chained to a second head to create a second linked list for the current layer.

10. The integrated circuit of claim 9, wherein when a last of the plurality of slices of the input feature map for the current layer is processed, the first head is to be swapped with the second head so that output feature map slices for the current layer in the second linked list is to be provided as input feature map slices for a next layer of the neural network model.

11. A method for processing data within an integrated circuit, the method comprising:
receiving, by a scheduler of the integrated circuit having a plurality of multiply and accumulate (MAC) units, a slice of a feature map extracted from input data provided to a neural network model deployed as a part of an artificial intelligence (AI) engine, the scheduler maintaining status information of the plurality of MAC units on the integrated circuit;
in response to receiving the slice of the feature map, selecting, by the scheduler, one or more MAC units from the plurality of MAC units; and
processing the slice of the feature map using the one or more MAC units.

12. The method of claim 11, wherein the scheduler includes a scheduler map with a bit array, with each element of the bit array corresponding to an MAC unit of the plurality of MAC units and including a bit indicating whether the MAC unit is idle or busy.

13. The method of claim 12, wherein the scheduler is to set a corresponding bit in the bit array to mark one of the plurality of MAC units as busy when that MAC unit is allocated to the slice of the feature map, and to reset the corresponding bit to mark the MAC unit as idle when each of a plurality of processing elements (PE) in that MAC unit has completed its allocated computation.

14. The method of claim 11, wherein the scheduler is to check a scheduler map to determine that processing capabilities of idle MAC units in the integrated circuit are sufficient for processing the slice of the feature map before scheduling the slice of the feature map for execution on the AI engine.

15. The method of claim 11, wherein the one or more MAC units are selected from a longest continuous idle MAC units on the integrated circuit, wherein a continuity of the one or more MAC units is based on locations of their corresponding bits in a bit array and indicates their physical closeness on the integrated circuit.

16. The method of claim 11, wherein the scheduler is an O (1) hardware scheduler implemented in the plurality of MAC units or an O (1) software scheduler implemented in a dynamic random-access memory on the integrated circuit.

17. The method of claim 11, wherein the integrated circuit further includes a static random access memory (SRAM) to store input feature maps, output feature maps, and weights for each of a plurality of layers of the neural network model.

18. The method of claim 17, wherein a plurality of slices of an input feature map for a current layer of the neural network model are chained with a first head to create a first linked list, and wherein after a slice of the input feature map has been processed by the AI engine, the slice of the input feature map is to be removed from the first linked list.

19. The method of claim 18, wherein a corresponding output feature map slice to the input map slice is chained to a second head to create a second linked list for the current layer.

20. A data processing system, comprising:
a host processor; and
one or more data processors coupled to the host processor, wherein each of the one or more data processors is in a form of an integrated circuit, and comprises:
a plurality of multiply and accumulate (MAC) units, and
a scheduler coupled to the plurality of MAC units to manage and allocate at least a portion of the plurality of MAC units to execute a neural network model deployed as a part of an artificial intelligence (AI) engine to process input data received from the host processor, the scheduler maintaining status information of the plurality of MAC units,
wherein in response to receiving a slice of a feature map extracted from the input data, the scheduler is to select one or more MAC units from the plurality of MAC units based on the status information corresponding to the one or more MAC units selected to process the slice of the feature map.

21. The system of claim 20, wherein the scheduler includes a scheduler map with a bit array, with each element of the bit array corresponding to an MAC unit of the plurality of MAC units and including a bit indicating whether the MAC unit is idle or busy.

* * * * *